United States Patent [19]

Nakate et al.

[11] 4,291,137
[45] Sep. 22, 1981

[54] ONE-PACK HIGH SOLID COATING COMPOSITION

[75] Inventors: Yasushi Nakate; Hiroshi Iwai; Kiyoshi Nanishi, all of Hiratsuka, Japan

[73] Assignee: Kansai Paint Co., Ltd., Hyogo, Japan

[21] Appl. No.: 71,795

[22] Filed: Aug. 31, 1979

[30] Foreign Application Priority Data

Sep. 8, 1978 [JP] Japan .................... 53-110473

[51] Int. Cl.³ ...................... C08L 61/20; C08L 63/00
[52] U.S. Cl. ............................... 525/162; 525/110; 525/161; 260/15
[58] Field of Search ............... 525/161, 162, 934, 110

[56] References Cited

U.S. PATENT DOCUMENTS

| | | | |
|---|---|---|---|
| 3,541,055 | 11/1970 | Malamet | 525/162 |
| 3,901,840 | 8/1975 | Irvin | 525/162 |
| 3,953,643 | 4/1976 | Cheung | 525/161 |
| 4,027,066 | 5/1977 | Victorius | 525/161 |
| 4,055,607 | 10/1977 | Sullivan | 525/162 |
| 4,137,389 | 1/1979 | Wingler | 525/162 |
| 4,181,783 | 1/1980 | Chattha | 525/161 |
| 4,181,784 | 1/1980 | Chattha | 525/161 |
| 4,181,785 | 1/1980 | Chattha | 525/161 |
| 4,184,025 | 1/1980 | Chattha | 525/161 |

FOREIGN PATENT DOCUMENTS

| | | | |
|---|---|---|---|
| 2812397 | 3/1979 | Fed. Rep. of Germany | 525/162 |
| 2855846 | 6/1979 | Fed. Rep. of Germany | 525/161 |

OTHER PUBLICATIONS

Canadian Paint & Finishing, Apr. 1977, pp. 50-53.
Kogyo Zairyo 24, No. 6, 30-34 (Jun. 1976).

*Primary Examiner*—Paul Lieberman
*Attorney, Agent, or Firm*—Wenderoth, Lind & Ponack

[57] ABSTRACT

A one-pack high solid coating composition consisting essentially of (I) 100 parts by weight of an acrylic resin which is a copolymer having a glass transition temperature of $-21°$ to $-50°$ C. and a hydroxyl number of 40 to 280 and being prepared from (a) one or more members selected from hydroxyalkyl acrylates and methacrylates of the general formula

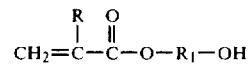

wherein R is a hydrogen atom or a methyl group and $R_1$ is a divalent alkyl group having 2 to 5 carbon atoms, and (b) one or more members selected from alkyl acrylates and methacrylates of the general formula

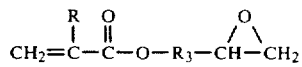

wherein R is as defined above and $R_2$ is a monovalent alkyl group having 1 to 12 carbon atoms, and glycidyl acrylates and methacrylates of the general formula

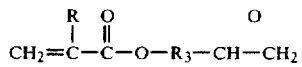

wherein R is as defined above and $R_3$ is a divalent alkyl group having 1 to 5 carbon atoms, (II) 20 to 160 parts by weight of an amino-formaldehyde resin etherified with a monohydric alcohol having 1 to 4 carbon atoms, and (III) 0.5 to 6 parts by weight, per 100 parts by weight of the total of the acrylic resin as component (I) and the etherified amino-formaldehyde resin as component (II) combined, of a blocked acid catalyst, said amount of the blocked acid catalyst being expressed in the amount of its acid.

6 Claims, No Drawings

ONE-PACK HIGH SOLID COATING COMPOSITION

This invention relates to a one-pack high solid coating composition comprising an amino resin and an acrylic resin combined.

Recently, a keen desire has been expressed to convert coating compositions for automobiles, industrial equipments, steel furniture and so forth into high solid ones of one-pack type and with less solvent content from the aspects of labor saving, energy saving, safety and hygiene. In the fields of one-pack amino-acrylic resin paints, one-pack amino-alkyd resin paints, and the like that have been hitherto put to such uses, several suggestions have been made to make them high solid.

Many of the conventional suggestions, however, aim to make their paints high solid by lowering the molecular weights of the resins, and this method has failed in imparting satisfactory quality such as weatherability to the resulting coatings.

An object of the present invention is therefore to provide a one-pack high solid amino-acrylic resin paint having satisfactory weatherability.

Another object of the present invention is to provide a one-pack high solid amino-acrylic resin coating composition comprising a high molecular weight acrylic resin.

The above objects of the present invention have been achieved by a one-pack high solid coating composition consisting essentially of (I) 100 parts by weight of an acrylic resin which is a copolymer having a glass transition temperature of $-21°$ to $-50°$ C. and a hydroxyl number of 40 to 280 and being prepared from (a) one or more members selected from hydroxyalkyl acrylates and methacrylates expressed by the general formula

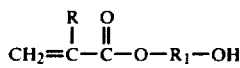

wherein R represents a hydrogen atom or a methyl group and $R_1$ represents a divalent alkyl group having 2 to 5 carbon atoms, and (b) one or more members selected from alkyl acrylates and methacrylates expressed by the general formula

wherein R is as defined above, and $R_2$ represents a monovalent alkyl group having 1 to 12 carbon atoms, and glycidyl acrylates and methacrylates expressed by the general formula

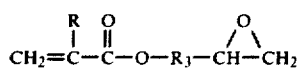

wherein R is as defined above, and $R_3$ represents a divalent alkyl group having 1 to 5 carbon atoms, (II) 20 to 160 parts by weight of an aminoformaldehyde resin etherified with a monohydric alcohol having 1 to 4 carbon atoms, and (III) 0.5 to 6 parts by weight, per 100 parts by weight of the total of the acrylic resin as component (I) and the etherified amino-formaldehyde resin as component (II) combined, of a blocked acid catalyst, the amount of the blocked acid catalyst being expressed in the amount of its acid.

One of the important characteristics of the present invention is to use as the acrylic resin [component (I)] an acrylic copolymer having a glass transition temperature of $-21°$ to $-50°$ C. and a hydroxyl number of 40 to 280.

In detail, it has been found by the present invention that a glass transition temperature set at $-21°$ to $-50°$ C. makes it possible to lower the solution viscosity of the acrylic resin without lowering the molecular weight of the acrylic resin, namely, to form a high solid coating composition without the need to lower the molecular weight of the acrylic resin. It has also been found that a hydroxyl number set at 40 to 280 enables the acrylic resin to effect an easy and sufficient curing reaction with the etherified amino-formaldehyde resin [component (II)], thus affording a cured coating having high crosslinking density.

Since the acrylic resin in the composition of the present invention need not have a lowered molecular weight, the composition of the present invention has been prevented from experiencing decreased weatherability that is caused by a low molecular weight acrylic resin so far employed to give a high solid paint. Further, since the acrylic resin in the composition of the present invention has a specific hydroxyl number, the crosslinking density of a cured coating is high as mentioned earlier, and the curability of a coating applied and the solvent resistance of a cured coating are markedly improved.

To attain the objects of the present invention, therefore, it is vital to use as an acrylic resin an acrylic copolymer having a glass transition temperature and a hydroxyl number within the specified ranges.

With the conventional amino-acrylic resin paints, on the other hand, the glass transition temperatures usually were higher than about 20° C. and up to 105° C., because of the conventional technical knowledge that the resins having glass transition temperatures of 20° C. or lower give decreased curability, causing the resulting coatings to remain sticky. Hence, aminoacrylic coating compositions having glass transition temperatures of 20° C. or below were not put to practical use prior to the present invention. The present invention has upset that conventional technical knowledge and has made it clear that the use of the specified acrylic resin affords a high solid coating composition which provides a coating having high performance.

The second feature of the present invention is to use an amino-formaldehyde resin [component (II)] etherified with a monohydric alcohol having 1 to 4 carbon atoms. The reason for its use is as follows: The curing of a coating from the composition of the present invention is mainly due to the ether interchange reaction between the etherified amino-formaldehyde resin and the acrylic resin and to the self-condensation reaction of the etherified amino-formaldehyde resin. Since these reactions are both alcohol-eliminating reactions, not formalin-eliminating reactions, there is no emission of an irritating odor characteristic of formalin during the curing with heating, and this is preferred in safety and hygiene. For the alcohol-eliminating reaction, an amino-formaldehyde resin etherified with an alcohol having 1 to 4 carbon atoms is more preferable that the amino-formaldehyde resin etherified with an alcohol having 5 or more carbon atoms, because the former resin causes easier alcohol elimination and a quicker curing reaction of a coating.

The third feature of the present invention is to use a blocked acid catalyst, thereby making it possible to afford the instantly claimed coating composition of one-pack type. The use of an acid catalyst which has not been blocked is undesirable, because the storage stability of the resulting coating composition would be low and its pot life would be short, thus making the handling of the coating composition troublesome and also considerably narrowing the range of uses for the coating composition.

The composition of the present invention, because of its possession of the above-described features, is one-pack and high solid, and its coating has excellent hardness, excellent solvent resistance, excellent weatherability, and excellent flexibility.

The reasons why the composition of the present invention has superior curability despite its use of an acrylic resin having a low glass transition temperature are not clear. The reasons, however, are supposed to be as follows: The low glass transition temperature facilitates the movement of the molecules of the acrylic resin. This results in a very good blending of the acrylic resin with the amino-formaldehyde resin [component (II)]. The good blending combined with the high hydroxyl number of the acrylic resin increases the density of crosslinking between the two resins, thus affording a coating with excellent curability. These facts can be recognized from the high hardness, gel content and elongation of a cured coating that has resulted.

The acrylic resin as component (I) in the present invention is an acrylic resin which is a copolymer having a glass transition temperature of $-21°$ to $-50°$ C. and a hydroxyl number of 40 to 280 and being prepared from (a) one or more members selected from hydroxyalkyl acrylates and methacrylates of the general formula

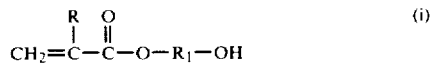

wherein R represents a hydrogen atom or a methyl group, and $R_1$ represents a divalent alkyl group having 2 to 5 carbon atoms, and (b) one or more members selected from alkyl acrylates and methacrylates of the general formula

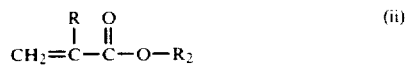

wherein R is as defined above, and $R_2$ represents a monovalent alkyl group having 1 to 12 carbon atoms, and glycidyl acrylates and methacrylates of the general formula

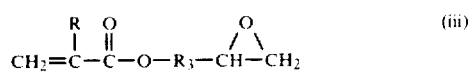

wherein R is as defined above, and $R_3$ represents a divalent alkyl group having 1 to 5 carbon atoms.

The acrylic resin [component (I)] in the present invention, as mentioned above, is a copolymer prepared from one or more members selected from the compounds of the general formula (i) [component (a)] and one or more members selected from the compounds of the general formulae (ii) and (iii) [component (b)].

Examples of the compounds of the general formula (i) include 2-hydroxyethyl methacrylate, 2-hydroxyethyl acrylate, hydroxypropyl acrylate and hydroxypropyl methacrylate.

Examples of the compounds of the general formula (ii) include methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, pentyl acrylate, pentyl methacrylate, hexyl acrylate, hexyl methacrylate, heptyl acrylate, heptyl methacrylate, 2-heptyl acrylate, 2-heptyl methacrylate, octyl acrylate, octyl methacrylate, nonyl acrylate, nonyl methacrylate, lauryl acrylate, lauryl methacrylate, cyclohexyl acrylate, cyclohexyl methacrylate, 2-ethylhexyl acrylate and 2-ethylhexyl methacrylate.

Examples of the compounds of the general formula (iii) include glycidyl acrylate and glycidyl methacrylate.

The above-mentioned acrylic resin may further contain acrylic acid and/or methacrylic acid as a comonomer component. The amount of acrylic acid or methacrylic acid is up to 5% by weight, preferably 1-3% by weight based on the weight of the total comonomers. An amount of acrylic acid or methacrylic acid exceeding 5% by weight must be avoided because such amount would lower the storage stability of the resulting coating composition and adversely affect the water resistance of the resulting coating.

The acrylic resin may also contain as a comonomer component another ethylenically unsaturated polymerizable monomer such as vinyl chloride, vinyl acetate, styrene, acrylamide, or vinyltoluene. The amount of this monomer is such an amount as to replace not more than 50% by weight, preferably not more than 35% by weight, of the total amount of the aforesaid components (a) and (b).

The acrylic resin of the present invention can be obtained by copolymerizing by a method known per se the aforesaid various monomers so combined that the resulting copolymer has a glass transition temperature of $-21°$ to $-50°$ C., preferably $-30°$ to $-50°$ C., and a hydroxyl number of 40 to 280, preferably 80 to 200.

The glass transition temperature can be determined by calculations from the equation $1/Tg = \Sigma(Wn/Tgn)$ where Tg is the glass transition temperature (absolute temperature) of the copolymer, Wn is the weight fraction of n monomer, and Tgn is the glass transition temperature (absolute temperature) of a homopolymer of n monomer. The hydroxyl number is measured in accordance with JIS K 1557-1970 6.4. Adjustment of the hydroxyl number is effected by the hydroxyl group-containing monomer expressed by the general formula (i).

If the acrylic resin has a glass transition temperature of higher than $-21°$ C., its blendability with the etherified amino-formaldehyde resin decreases and the curability of a coating becomes poor, and further, the solution viscosity becomes high, thus making it difficult to form a high solid coating composition. If the glass transition temperature of the acrylic resin is lower than −50° C., on the other hand, the hardness of the resulting cured coating is low.

If the hydroxyl number of the acrylic resin is less than 40, the curability of the resulting coating is poor. If it is greater than 280, the solution viscosity is high, making it difficult to form a high solid coating composition.

In addition, the molecular weight of the acrylic resin also influences the durability, hardness and water resistance of the resulting cured coating.

To afford a satisfactory coating, the suitable acrylic resin has a molecular weight, expressed in a peak molecular weight by gel permeation chromatography (GPC), of about 5,000 to 50,000, preferably about 10,000 to 40,000. If that molecular weight is lower than about 5,000, the resulting cured coating is inferior in physical strength, durability, and set to touch. If it is higher than about 50,000, the resulting composition is inferior in adhesiveness to a previously applied coated film, in workability in a coating procedure, and in rendering it high solid.

In the present invention, the etherified aminoformaldehyde resin [component (II)] to be used in combination with the acrylic resin [component (I)] is the one obtained by etherifying an amino-formaldehyde resin with a monohydric alcohol having 1 to 4 carbon atoms.

The amino-formaldehyde resin to be etherified includes, for example, the reaction product of formaldehyde with at least one amino compound selected from melamine, urea, benzoguanamine, acetoguanamine, stearoguanamine, and spiroguanamine.

The alcohol used to etherify the amino-formaldehyde resin is a monohydric alcohol having 1 to 4 carbon atoms, its examples being methyl alcohol, ethyl alcohol, propyl alcohol, isopropyl alcohol, butyl alcohol, and isobutyl alcohol. A monohydric alcohol having 5 or more carbon atoms would make difficult the ether interchange reaction at the time of the curing of a coated film; that is, the curability of the coated film would decrease.

Said etherified amino-formaldehyde resin should preferably be a mononucleus to trinucleus compound, and the etherification should preferably be effected to such a degree that not less than 30%, preferably not less than 50%, more preferably not less than 65%, of the total methylol groups are etherified.

To cure the coating composition of the present invention, there is used an acid catalyst hitherto employed to cure amino-acrylic resins, said acid catalyst having been blocked with an epoxy resin.

The acid catalyst to be blocked may be any of known acids that have been used so far to cure aminoacrylic resins, but is preferably a sulfonic acid, and its preferred examples include xylenesulfonic acid, toluenesulfonic acid, benzenesulfonic acid, and methanesulfonic acid. Examples of the epoxy resin used to block the acid catalyst are epoxy resins prepared by reacting epichlorohydrin with polyhydric alcohols, polyhydric phenols or the like. Examples of the polyhydric alcohols include alkylene glycols, diols, glycerin, and trimethylolpropane. Examples of the polyhydric phenols include 2,2'-bis(4-hydroxyphenyl)propane, 2,2'-bis(4,4'-hydroxyphenyl)methane, tris(4-hydroxyphenyl)propane, novolak type phenols, and cresol type phenols. Of these epoxy resins, those having an epoxy equivalent of 100 to 2500 are preferred. Specific examples thereof are EPI-KOTE 812, 815, 827, 828, 832, 834, 836, 1001, and 1007 (all trade names for products of Shell Chemical Co.)

The proportion of the acid to the epoxy resin is preferably 10 to 40 parts by weight of the acid per 100 parts by weight of the epoxy resin. Both these components are heated for about 0.5 to 5 hours at about 50° to 150° C. thereby to obtain a blocked acid catalyst for use in the present invention. If the amount of the acid is less than 10 parts by weight, the epoxy resin is in excess of the acid, thus reducing the weatherability of the resulting coated film. If its amount is greater than 40 parts by weight, the acid is in excess of the epoxy resin, thus causing the undesirable phenomenon that the resulting coating composition gels during storage.

Said blocking of the acid catalyst has made it possible to form the coating composition of the present invention of one-pack type and make it unnecessary to perform a painstaking procedure of blending an acid catalyst with the other components before use.

The proportions of the acrylic resin and the etherified amino-formaldehyde resin used in the coating composition of the present invention are such that the etherified amino-formaldehyde resin is used in an amount of 20 to 160 parts by weight per 100 parts by weight of the acrylic resin. If the amount of the etherified aminoformaldehyde resin is larger than 160 parts by weight, the resulting coated film is too hard and physically very brittle. If its amount is less than 20 parts by weight, on the other hand, a sufficient curing does not occur.

The amount of the acid catalyst to be blended is preferably 0.5 to 6 parts by weight, more preferably 1 to 5 parts by weight, expressed in the amount of the acid contained in the blocked acid catalyst, per 100 parts by weight of the solids of the mixture of the acrylic resin and the etherified amino-formaldehyde resin. If the amount of the acid is smaller than 0.5 part by weight, the resulting coating composition is cured insufficiently, while if its amount is larger than 6 parts by weight, the weatherability and water resistance of the resulting coating are reduced.

The respective components of the high solid coating composition of the present invention usually contain organic solvents that have been used in the steps of producing the components, and therefore, the composition of the present invention composed of these components contains the organic solvents. The composition of the present invention may also contain organic solvents in addition to the organic solvents that have been contained in the respective components. These additional organic solvents may be the same as or different from the organic solvents that have been contained in the respective components.

The content of the organic solvents is an amount corresponding to 50% by weight or less, preferably 20 to 45% by weight, of the resulting coating composition. Examples of the usable organic solvents include hydrocarbon type solvents such as heptane, toluene, or xylene; alcohol type solvents such as propyl alcohol or butanol; ester type solvents such as ethyl acetate or butyl acetate; ketone type solvents such as acetone or methyl ethyl ketone; and other ether type, alcohol ether type, alcohol ester type, and ether ester type organic solvents. The types of the solvents are not critical.

In the present invention, it is possible, if desired, to use as an auxiliary vehicle a film-forming cellulose derivative such as cellulose acetate butyrate or nitrocellulose, thereby affording a coating composition having good workability in a metallic coating process. The amount of the auxiliary vehicle added is preferably within the range of 1 to 15 parts by weight per 100 parts by weight of the solids of the mixture of the acrylic resin and the etherified amino-formaldehyde resin. If its amount is larger than 15 parts by weight, there is a possibility that the resulting coating has reduced physical properties, and especially when it is nitrocellulose, discoloration due to heat or ultraviolet rays occurs.

The composition of the present invention, if need be, may further contain inorganic or organic coloring pigments, metallic powder pigments, and fillers.

The coating composition of the present invention can be coated by means of an ordinary air spray, airless spray, electrostatic coating, roll coater, curtain flow coater, or the like. The curing of the resulting coated film is carried out by heating it at about 100° to 160° C. for about 10 to 40 minutes.

The resulting film is tough and superior in weatherability, hardness, solvent resistance, non-stickiness, thickness retention, and durability, and thus, the composition of the present invention is of high value in various applications.

The present invention is described in greater detail with reference to the following examples. In the Production Examples and the Examples, the parts and the percentages are parts by weight and % by weight, respectively, unless otherwise specified. Further, unless otherwise indicated, the molecular weights of the polymers are expressed in the peak molecular weights by gel permeation chromatography, and the viscosities, in those measured by a Gardner-Holdt viscometer at 25° C.

EXAMPLES OF PRODUCTION OF RESINOUS VARNISH (A) Examples of production of acrylic resin

Production Example 1

A 300-ml four-necked flask equipped with a thermometer, a stirrer, a cooler and a dropping funnel was charged with 56.3 parts of butyl acetate. After the air inside the flask was replaced with nitrogen, the contents were maintained at 30° C. or lower. Then, a monomer mixture consisting of 2.0 parts of azobisisobutyronitrile, 60.0 parts of n-butyl acrylate, 30.0 parts of 2-hydroxyethyl acrylate and 10.0 parts of styrene was taken into the dropping funnel and added dropwise over the course of 3 hours while the contents of the flask were maintained at 120° C. After the dropwise addition, the mixture was maintained at 120° C. for 1 hour. Then, a mixture of 0.5 part of azobisdimethylvaleronitrile and 10 parts of butyl acetate was added dropwise over the course of 1.5 hours, followed by reacting the resultant mixture for 2 hours at 120° C.

Thereby was obtained at a rate of polymerization of 100% a varnish (solids content 60%) of an acrylic resin having a peak molecular weight by gel permeation chromatography of about 18,500, a viscosity at a solids content of about 60% of N (Gardner-Holdt viscosity at 25° C.; the same is true hereinafter), a hydroxyl number of 145, and a glass transition temperature of −37° C.

Production Examples 2 to 8

Acrylic resin varnishes were prepared in the same way as in Production Example 1 with the use of the monomer blends shown in Table 1. The solids contents of the varnishes were all adjusted to 60%.

TABLE 1

| | | Production Examples | | | | | | |
|---|---|---|---|---|---|---|---|---|
| | | 2 | 3 | 4 | 5 | 6 | 7 | 8 |
| Monomer components | n-Butyl acrylate | 20.0 | 15.0 | 20.0 | 60.0 | | 20.0 | 20.0 |
| | 2-Ethylhexyl acrylate | 25.0 | 55.0 | 51.0 | 10.0 | 50.0 | 11.0 | 25.0 |
| | Lauryl acrylate | | | | | 10.0 | | |
| | Ethyl acrylate | 8.0 | | | | | 8.0 | 8.0 |
| | n-Butyl methacrylate | 13.0 | | | | 10.0 | 13.0 | 13.0 |
| | Methyl methacrylate | | 5.0 | | | | | |
| | Styrene | 1.0 | 5.0 | 8.0 | 5.0 | | 15.0 | 1.0 |
| | 2-Hydroxyethyl acrylate | 33.0 | 20.0 | 20.0 | 25.0 | 30.0 | 33.0 | 33.0 |
| | Acrylic acid | | | 1 | | | | |
| Catalysts | Azobisisobutyronitrile | 4.0 | 0.5 | 3.5 | 2.5 | 3.5 | 4.0 | 5.0 |
| | Tert-dodecyl mercaptan | | | 2.0 | | | | 2.0 |
| | Azobisdimethylvaleronitrile | 0.5 | 1.0 | 0.5 | 0.5 | 0.5 | 0.5 | 1.5 |
| Properties of resins | Glass transition temperature (°C.) | −33 | −36 | −38 | −43 | −33 | −17 | −33 |
| | Hydroxyl number | 160 | 95 | 120 | 120 | 145 | 160 | 160 |
| | Molecular weight | 10000 | 28500 | 11000 | 15500 | 11000 | 10000 | 4000 |
| | Acid value | 0 | 0 | 8 | 0 | 0 | 0 | 0 |
| | Viscosity of varnish at solids content of 60% | F | T | G | H | G | G | B |

(B) Examples of production of etherified amino-formaldehyde resin

Production Example 9

126 Parts of melamine, 525 parts of an isobutanol/formalin solution (formaldehyde concentration 40%), 625 parts of isobutanol, and 56 parts of pure water were added into a reaction vessel, where they were heated under reflux for 3 hours for dehydration. Then, the excess of isobutanol was substituted with xylene to obtain a xylene solution of an amino-formaldehyde resin etherified with isobutanol (ratio of etherification: about 66% of the methylol groups).

The resulting solution had a solids content of 80% and showed a Gardner-Holdt viscosity of P.

Production Example 10

126 Parts of melamine, 250 parts of n-butanol, 520 parts of an n-butanol/formalin solution (formaldehyde concentration: 40%) and 0.01 part of phthalic anhydride were mixed, and heated under reflux for 3 hours for dehydration. Then, the excess of n-butanol was replaced with xylene to form a xylene solution of a melamine-formaldehyde resin etherified with n-butanol (ratio of etherification: about 67% of the methylol groups).

The resulting solution had a solids content of 70% and showed a Gardner-Holdt viscosity of E.

(C) Examples of production of acid catalyst

Production Example 11

72 Parts of EPIKOTE 815 (a product of Shell Chemical Co.) was taken into a four-necked flask, and heated with stirring. When the heated compound reached 80° C., 28 parts of para-toluenesulfonic acid was added in a small amount at a time. After the addition, the mixture was stirred for about 2 hours at 80° C. Two hours later, the mixture was cooled to obtain a blocked acid catalyst.

The resulting blocked acid catalyst had a solids content of 100% and a melt viscosity at 120° C. of about 20 poises.

Example 1

230 Parts of titanium dioxide (R-500, pigment of a product of Teikoku Kako Co., Ltd.), 8 parts of methyl ethyl ketone, 18 parts of xylene, and 2.0 parts of a dispersing agent (Reybo #3, a product of Reybo Chemical Co., Ltd.) were dispersed in 80 parts of the acrylic resin varnish of Production Example 1 by means of a pebble mill until the dispersion became 10 microns in size. Immediately after that size was reached, 18 parts of said acrylic resin varnish was added to the dispersion, and the pebble mill was operated for about 30 minutes to stabilize the mixture. Then, 333 parts of said acrylic resin varnish, 30 parts of methyl ethyl ketone, 76 parts of xylene, and 106 parts of the etherified amino-formaldehyde resin solution of Production Example 9 were mixed uniformly with said pebble mill base with stirring, thereby to obtain a coating composition. Further, 61 parts of the blocked acid catalyst obtained in Production Example 11 was added to the composition, followed by uniformly mixing them by a stirrer. The resulting coating composition had a solids content of 65%.

The resulting coating composition, without being further diluted, was coated on a polished soft steel sheet (300×90×0.8 mm) to a film thickness of 35 to 45 microns. Then, the coated film was allowed to stand for about 15 hours in a room, and then, cured under the conditions shown in Table 3 to make a specimen. The results of tests conducted on the specimen are also shown in Table 3.

Examples 2 to 9 and Comparative Examples 1 to 3

Coating compositions were prepared in the same way as in Example 1 in accordance with the formulations (parts by weight) indicated in Table 2. Each of the coating compositions was coated on a test sheet in the same way as in Example 1, and the coated film was tested for performances. The results are illustrated in Table 3.

TABLE 2

| | Examples | | | | | | | | Comparative Examples | | |
|---|---|---|---|---|---|---|---|---|---|---|---|
| | 2 | 3 | 4 | 5 | 6 | 7 | 8 | 9 | 1 | 2 | 3 |
| Acrylic resin varnish of production Example 2 | 166 | | | | | | 166 | | | | |
| Acrylic resin varnish of production Example 3 | | 166 | | | | | | 100 | | | |
| Acrylic resin varnish of production Example 4 | | | 166 | | | | 66 | 66 | | | |
| Acrylic resin varnish of production Example 5 | | | | 166 | | | | | 166 | | |
| Acrylic resin varnish of production Example 6 | | | | | 166 | | | 100 | | | |
| Acrylic resin varnish of production Example 7 | | | | | | | | | | 166 | |
| Acrylic resin varnish of production Example 8 | | | | | | | | | | | 166 |
| Etherified amino-formaldehyde resin varnish of production Example 9 | 50 | 75 | 100 | | | | 63 | 88 | 125 | 50 | 50 |
| Etherified amino-formaldehyde resin varnish of production Example 10 | | | | 143 | 171 | 228 | | | | | |
| Blocked acid catalyst of production Example 11 | 10 | 17 | 25.7 | 35.7 | 25.7 | 13.9 | 13.4 | 21.3 | | 10 | 10 |
| Titanium dioxide pigment | | 112 | | | | | | 119 | 160 | | |
| 25% Solution of EAB-551-0.2 (*1) | | 76.8 | | | | | | | | | |
| 25% Solution of DN-RS ¼ (*2) | 16.8 | | | | | | | | | 16.8 | 16.8 |
| Dispersing agent (Reybo #3 (*3)) | 1 | 1 | 1 | 1 | 1 | 1 | 1 | 1 | 1 | 1 | 1 |
| Methyl ethyl ketone/xylol (60/40) | 6 | 12 | 4 | 6 | 8 | 10 | 8 | 10 | 16 | 6 | 6 |
| Total | 249.8 | 459.8 | 296.7 | 351.7 | 371.7 | 418.9 | 251.4 | 405.3 | 468 | 249.8 | 249.8 |
| Solids content of coating composition (%) | 61.7 | 67.0 | 69.3 | 67.0 | 66.1 | 65.3 | 65.0 | 76.5 | 76.9 | 61.7 | 61.7 |

(*1) EAB-551-0.2 is a trade name for cellulose acetate butyrate produced by Eastman Chemical Products, Inc.
(*2) DN-RS ¼ is a trade name for nitrocellulose produced by Dicel Ltd.
(*3) Reybo #3 is a trade name for a product of Reybo Chemical Co., Ltd.

TABLE 3

| | | Curing conditions | Gloss | Pencil Hardness | Gasoline resistance | Toluol resistance | Water resistance | Accelerated weatherability | Gel content (%) | Yellowing resistance | Elongation (%) |
|---|---|---|---|---|---|---|---|---|---|---|---|
| Examples | 1 | 120° C. 30 min. | 94 | HB | Unaffected | Unaffected | Unaffected | Unaffected | 96 | 1.82 | 73 |
| | 2 | 140° C. 20 min. | 93 | H | Unaffected | Unaffected | Unaffected | " | 96 | 0.81 | 65 |
| | 3 | 140° C. 20 min. | 94 | 2H | Unaffected | Unaffected | Unaffected | " | 98 | 0.62 | 67 |
| | 4 | 130° C. 30 min. | 92 | H | Unaffected | Unaffected | Unaffected | " | 95 | 0.73 | 70 |
| | 5 | 120° C. 30 min. | 91 | 2H | Unaffected | Unaffected | Unaffected | " | 97 | 0.75 | 82 |
| | 6 | 150° C. 30 min. | 92 | H | Unaffected | Unaffected | Unaffected | " | 96 | 0.68 | 62 |
| | 7 | 150° C. 30 min. | 93 | H | Unaffected | Unaffected | Unaffected | " | 96 | 0.77 | 52 |
| | 8 | 140° C. 30 min. | 93 | H | Unaffected | Unaffected | Unaffected | " | 96 | 0.72 | 60 |
| | 9 | 140° C. 20 min. | 92 | H | Unaffected | Unaffected | Unaffected | " | 96 | 0.64 | 61 |
| Comparative Examples | 1 | 150° C. 30 min. | 93 | 2B or lower | The coated film melted | | Blisters formed | The gloss decreased | 62 | 0.68 | 26 |
| | 2 | 140° C. 30 min. | 90 | B | The coated film softened | | Blisters formed | The gloss decreased | 71 | 1.42 | 46 |
| | 3 | 140° C. 30 min. | 92 | 2B | The coated film softened | | Blisters formed | The gloss decreased and cracks occurred | 94 | 0.78 | 93 |

The testing methods are as follows:

(1) Gloss

The gloss was determined from the 60° specular reflectance of the specimen. For the composition containing no pigment, that reflectance was measured after the composition was coated on a black glass sheet and cured in the same way as described earlier.

(2) Pencil hardness

The pencil hardness was determined by scratching the specimen with a pencil at 20° C.

(3) Gasoline resistance

The gasoline resistance was investigated by wiping the specimen 40 times with gauze wetted wih regular type gasoline at 20° C.

(4) Toluol resistance

The toluol resistance was investigated by dipping the specimen for 24 hours in toluol at 20° C.

(5) Water resistance

The water resistance was investigated by dipping the specimen for 7 days in water at 20° C.

(6) Accelerated weatherability

The accelerated weatherability was investigated by irradiating the specimen for 1000 hours by a weatherometer.

(7) Gel content

The gel content was determined from the amount of a residue resulting after dissolving the specimen in acetone.

(8) Yellowing resistance

The yellowing resistance was determined by irradiating the specimen by a germicidal lamp for 24 hours, then measuring the L, a and b values of the specimen, and calculating $\Delta E$.

(9) Elongation

The coating composition was dried on a tin plate so that the thickness of its dry film was $200\pm10\mu$, and the coated film was then dried under the curing conditions shown in Table 3. The dry coated film was isolated with amalgam and cut into a size of $10\times40$ mm. The cut film was pulled at a rate of 10 mm/min. at 20° C. by a tensilon until the film was broken, thereby to measure the elongation.

What is claimed is:

1. A one-pack high solid coating composition consisting essentially of (I) 100 parts by weight of an acrylic resin which is a copolymer having a glass transition temperature of $-30°$ to $-50°$ C. and a hydroxyl number of 40 to 280 and being prepared from (a) one or more members selected from hydroxyalkyl acrylates and methacrylates of the formula

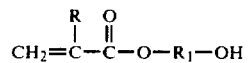

wherein R represents a hydrogen atom or a methyl group and $R_1$ represents a divalent alkyl group having 2 to 5 carbon atoms, and (b) one or more members selected from alkyl acrylates and methacrylates of the formula

wherein R is as defined above and $R_2$ represents a monovalent alkyl group having 1 to 12 carbon atoms, and glycidyl acrylates and methacrylates of the formula

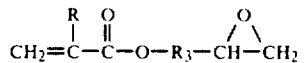

wherein R is as defined above and $R_3$ represents a divalent alkyl group having 1 to 5 carbon atoms, (II) 20 to 160 parts by weight of an amino-formaldehyde resin etherified with a monohydric alcohol having 1 to 4 carbon atoms, and (III) 0.5 to 6 parts by weight, per 100 parts by weight of the total of the acrylic resin as component (I) and the etherified amino-formaldehyde resin as component (II) combined, of a sulfonic acid catalyst blocked by an epoxy resin, said amount of the blocked acid catalyst being expressed in the amount of its acid.

2. A composition as recited in claim 1, wherein the acrylic resin as component (I) is a copolymer having a glass transition temperature of $-30°$ to $-50°$ C. and a hydroxyl number of 40 to 280 and being prepared from a monomer mixture of the component (a), the component (b) and up to 5% by weight, based on the weight of the monomer mixture, of acrylic acid or methacrylic acid.

3. A composition as recited in claim 1, wherein the acrylic resin is a copolymer having a glass transition temperature of $-30°$ to $-50°$ C. and a hydroxyl number of 40 to 280 and being prepared from a monomer mixture of the component (a) and the component (b), said monomer mixture being one in which not more than 50% by weight of the total amount of the components (a) and (b) is replaced with another ethylenically unsaturated polymerizable monomer.

4. A composition as recited in claim 1, wherein the etherified amino-formaldehyde resin as component (II) is prepared by etherifying 30% or more of the methylol groups of an amino-formaldehyde resin with a monohydric alcohol having 1 to 4 carbon atoms.

5. A composition as recited in claim 1, wherein the acrylic resin as component (I) has a molecular weight, expressed in a peak molecular weight by gel permeation chromatography, of about 5,000 to 50,000.

6. A composition as recited in claim 1, which contains, in addition to the components (I), (II) and (III), a film-forming cellulose derivative as an auxiliary vehicle.

* * * * *